US006980641B1

(12) United States Patent
Stanford et al.

(10) Patent No.: US 6,980,641 B1
(45) **Date of Patent: *Dec. 27, 2005**

(54) METHOD AND APPARATUS FOR CONTROLLING A COMPUTER TO IMPLEMENT TELEPHONE FUNCTIONS WITH AN ENHANCED MINIDIALER FUNCTION

(75) Inventors: Michael D. Stanford, Dallas, TX (US); Ronald Scott Langham, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/182,833

(22) Filed: Oct. 29, 1998

(51) Int. Cl.[7] .................................................. H04M 1/00
(52) U.S. Cl. .............. 379/354; 379/355.06; 379/387.01
(58) Field of Search ....................... 379/355.01, 355.02, 379/355.05, 356.01, 354, 201.01, 201.02, 110.01; 345/835

(56) References Cited

U.S. PATENT DOCUMENTS 5,884,032 A * 3/1999 Bateman et al. ....... 379/265.09
6,018,571 A * 1/2000 Langlois et al. ....... 379/201.02
6,240,168 B1 * 5/2001 Stanford et al. ....... 379/110.01

* cited by examiner

*Primary Examiner*—Forester W. Isen
*Assistant Examiner*—Jefferey Harold
(74) *Attorney, Agent, or Firm*—Kenneth J. Cool

(57) ABSTRACT

An enhanced telephone emulation computer system including a minidialer program for controlling a computer to add telephony functions which can be invoked from whatever active program is currently controlling the computer. The minidialer program controls the computer to alter its processing depending upon the context existing at the time when a mouse click or hot key combination event is detected indicating the user wishes to invoke a telephony function. The minidialer program determines whether the user has highlighted any text or numbers in the active window of the application currently controlling the computer and whether the highlighted material is a name or a phone number, and if a name, whether the name is stored with a phone number in a phone book or file maintained on the computer. Processing and telephony menu options displayed as available also depend upon whether the user is or is not on the phone at the time the mouse click or hot key event occurs. In some embodiments, if the user has highlighted a URL, a browser will be launched and the web page corresponding to the URL will be opened.

16 Claims, 4 Drawing Sheets

Context Sensitive Processing For Enhanced Minidialer

METHOD AND APPARATUS FOR CONTROLLING A COMPUTER TO IMPLEMENT TELEPHONE FUNCTIONS WITH AN ENHANCED MINIDIALER FUNCTION

FIELD OF USE

The invention pertains to the field of application software that makes use of the TAPI interface and TAPI library of functions in the Windows series of operating systems for personal computers, or similar libraries of functions in other operating systems to implement telephone functions using a modem or other computer enabled telephone line interface hardware.

Application programs for personal computers to implement telephone functions are known. These applications are useful in the modern office environment because they are capable of implementing telephones which have more functionality than the actual telephones on the desks of workers. Such functions as answering machine capability, call recording capability, speed dial, conferencing, playing outgoing messages, transfer to voice mail etc. are features that most office telephones do not have. The particular features which are implemented by the phone vary from one application to another, and the particular features implemented in the telephone application are not critical to this invention.

One class of application processes that perform certain useful and frequently used functions are called dialers. Dialers are programs that can dial phone numbers, look up phone numbers and dial them etc. One example of a dialer in the prior art is the minidialer included with the PhoneKits™ and CT Pro™ telephone emulation programs sold by the assignee of the present invention.

One of the problems with existing dialers is that they are not context sensitive and this presents a complicated menu structure to be negotiated by a person who is on the phone with another person and wants to, for example, transfer the call to another person or conference in another person. This person may be distracted or paying her full attention to the ongoing conversation and does not want to be confronted with any complexity that requires diversion of attention away from the conversation.

Thus, a need has arisen for a dialer application that has many capabilities such as conference, transfer, hold, park, drop, hold, dial a highlighted number on a list etc., and which can do this job with a context sensitive menu form to simplify the options displayed to the user based upon the situation.

As far as the applicants are aware, there is no other dialer application of any sort that implements a dialer function which displays context sensitive menu options.

SUMMARY OF THE INVENTION

The genus of the invention is defined as the class of computer programs for controlling computers coupled to TAPI compliant telephony devices to perform dialer type functions with context sensitive menus. All species of the process of the invention will be carried out in a computer having an operating system and a library of programs that control the computer to implement specific telephony functions. In a broad definition of the genus of processes implementing the invention, the following steps will be performed:

determining when a predetermined event has occurred indicating a user of said computer wishes to implement a telephony function, said predetermined event being any event caused by any predetermined user manipulation of user input devices coupled to said computer indicating a desire to see a menu of available telephony functions;

displaying a context sensitive menu of available telephony functions when said predetermined event is detected; and determining which if any menu option is selected, and invoking into execution the particular computer program in said library of computer programs so as to control said computer to implement the selected telephony function.

Specifically, all species in the apparatus genus of the invention have the following shared characteristics:

when a pointing device mouse click on a dialer icon is detected or a hot key combination is pressed on a keyboard, a dialer program goes into execution to control a computer having an operating system with a library of programs that implement telephony functions;

the computer is also controlled by at least one application program controlling the display in an active window;

the mouse click or hot key event causes the dialer to control the computer to display a dialer menu;

the displayed dialer menu options are context sensitive;

context sensitive means only the menu options available for selection in the particular status of highlighted text or numbers in the active window and/or state of the existence or nonexistence of an ongoing telephone call determine which telephony functions are available for selection on the menus;

when a menu option is selected, the program that implements that particular telephony function is invoked into execution and controls the computer to implement the telephony function.

In the preferred embodiment, the particular context sensitive menu options that are displayed for selection depend upon:

whether the user has any text or numbers selected in a window of the current application program;

whether the selected text or numbers appear to be a phone number or not;

if not a phone number, whether the selected text matches any stored name in an phone book file stored in memory or on a hard disk peripheral of said computer;

whether or not the user of said computer is or is not currently using said TAPI telephony device in an ongoing telephone conversation; and regardless of whether the user is or is not currently engaged in a telephone conversation, whether or not a telephone number has been highlighted in a window of the current application program.

In an alternative embodiment, if the highlighted text is not a name and not a phone number but appears to be a URL, the dialer program launches a web browser, logs on if necessary, and opens the web page identified by the URL.

In some species, the dialer program controls the computer to control the video display to show a dialer icon which is visible at all times either in or near the title bar of the currently active window or in or near the system tray. The reason the title bar is selected for display of the minidialer icon is that the minidialer effectively adds a dial button to whatever the active program is so a user can highlight a phone number in any program she is using and click on the minidialer to dial the number by selecting a context sensitive menu selection. By putting the minidialer icon in the title bar, there is no need to know what or where any other buttons are displayed in the active window of the active program. This property of retrofitting any program with a dial button and other telephony features to give it telephony capability is believed to be new. The property of displaying the available telephony functions retrofitted to the active window in a context sensitive manner is also new.

In some species, a mouse click on the dialer icon or hot key event causes a context sensitve drop down menu of available telephony functions to appear with some menu options associated with a second level of menu or a dialog box appearing when the option is selected.

In an alternative embodiment where the Windows 98 operating system is in use the minidialer program links to the normal Windows 98 context senstive menus through an API to retrofit the active window and active application process which is painting the active window with telephony functions using the right click menus. For example, if the user has any text highlighted in a word processing document, data base or contact manager, and the user right clicks, in addition to the normal options of undo, font, spellcheck, copy, cut, paste etc. additional telephony functions of dial, conference, transfer, look up and pop are displayed.

DETAILED DESCRIPTION OF THE PREFERRED EMBODIMENT

Figure 1:
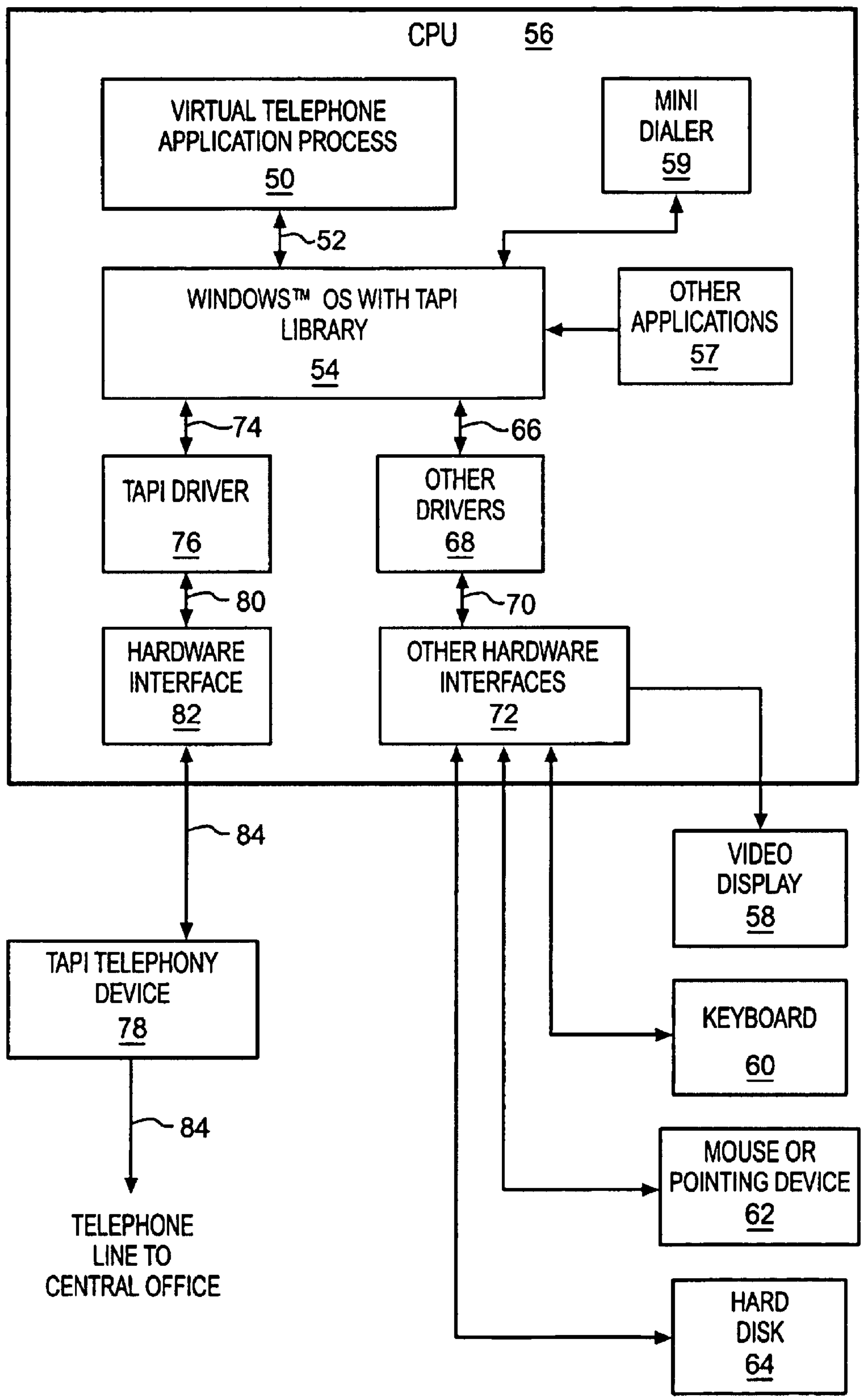
FIG. 1 is a block diagram of the hardware platform and software architecture for a system according to the teachings of the invention.

Referring to FIG. 1, there is shown a block diagram showing the hardware and software architecture of the preferred platform in which the process and apparatus of the invention find utility. An application program 50 which is capable of displaying a virtual telephone on a video display 58 coupled to computer 56 and implementing telephony functions in cooperation with a telephony device 78 communicates through a TAPI interface with the Windows operating system 54 which controls operation of computer 56. The invention is not intended to be limited to the Windows Operating System or the TAPI library in the Windows Operating System. Any operating system with a library of programs that implement telephony function and an application programmatic interface that allows these library programs to be invoked into execution by other programs so as to control a telephony device coupled to said computer to implement telephony functions will suffice to practice the invention. The TAPI interface is a Windows application programmatic interface which provides a plurality of defined function calls which may be invoked by virtual telephone application process 50. Each function call and its argument, if any, invokes into execution a program in a TAPI library of programs provided with the Windows OS 54 (or an analogous program in a library of telephone function programs in another OS). That program then controls execution of computer 56 to carry out a specific telephone function associated with the function call.

The computer 56 is also programmed with one or more other application programs symbolized by block 57 which also control the operation of the computer in cooperation with the operating system when active. "Active" means that the application program has a window on the display in which the results of processing by the program are displayed and that window is the active window meaning that the instructions of the particular application program that is creating the content of the window are controlling operations by the computer. The other applications programs can be anything, but typically, they are word processing programs, contact manager database programs to maintain records of phone numbers, addresses, URL for various people, address or telephone book application programs also to maintain records of phone numbers, addresses, URLs for various people and/or organizations and a web browser such as the excellent web browser Navigator by Netscape. As will be explained below, names or telephone numbers or URLs can be highlighted using the pointing device either during or before telephone calls. The on-hook or off-hook status of the telephony device coupled with the fact of whether or not some text or numbers are highlighted in the active window and whether the highlighted material is a name, telephone number or URL and, if a name, whether it matches any names stored in a telephone book of names and phone numbers maintained by the virtual telephone application 50 will determine the telephony menu options available to a user and processing by the computer. This is the meaning of context sensitive menus or menu options in the description of the invention and the appended claims.

Figure 2A:
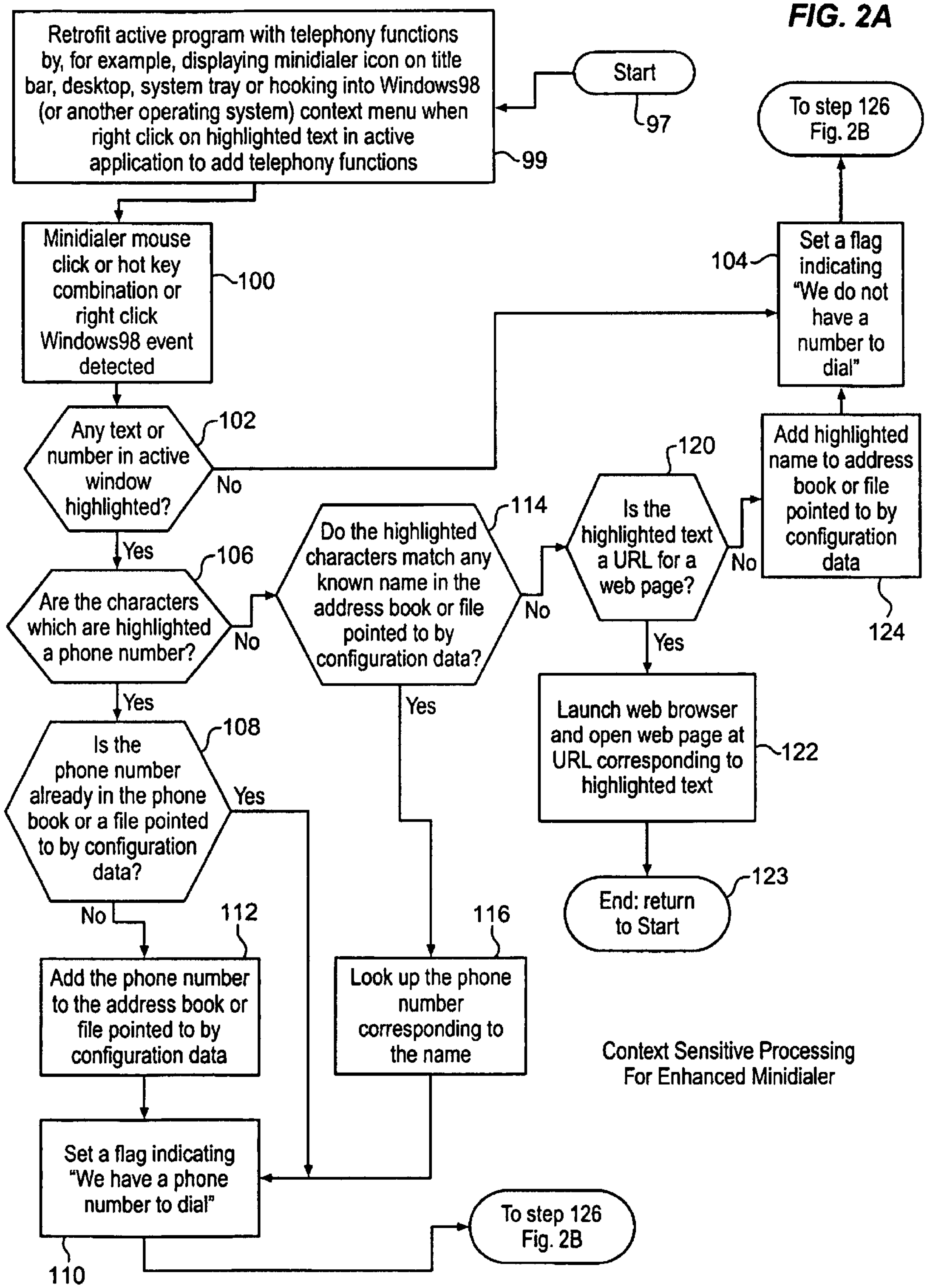
FIGS. 2A–2B are a flowchart symbolizing the processing of the minidialer program to retrofit the active application and active window with telephony functions and to provide context sensitive menus by which these telephony functions can be invoked.
Figure 2B:
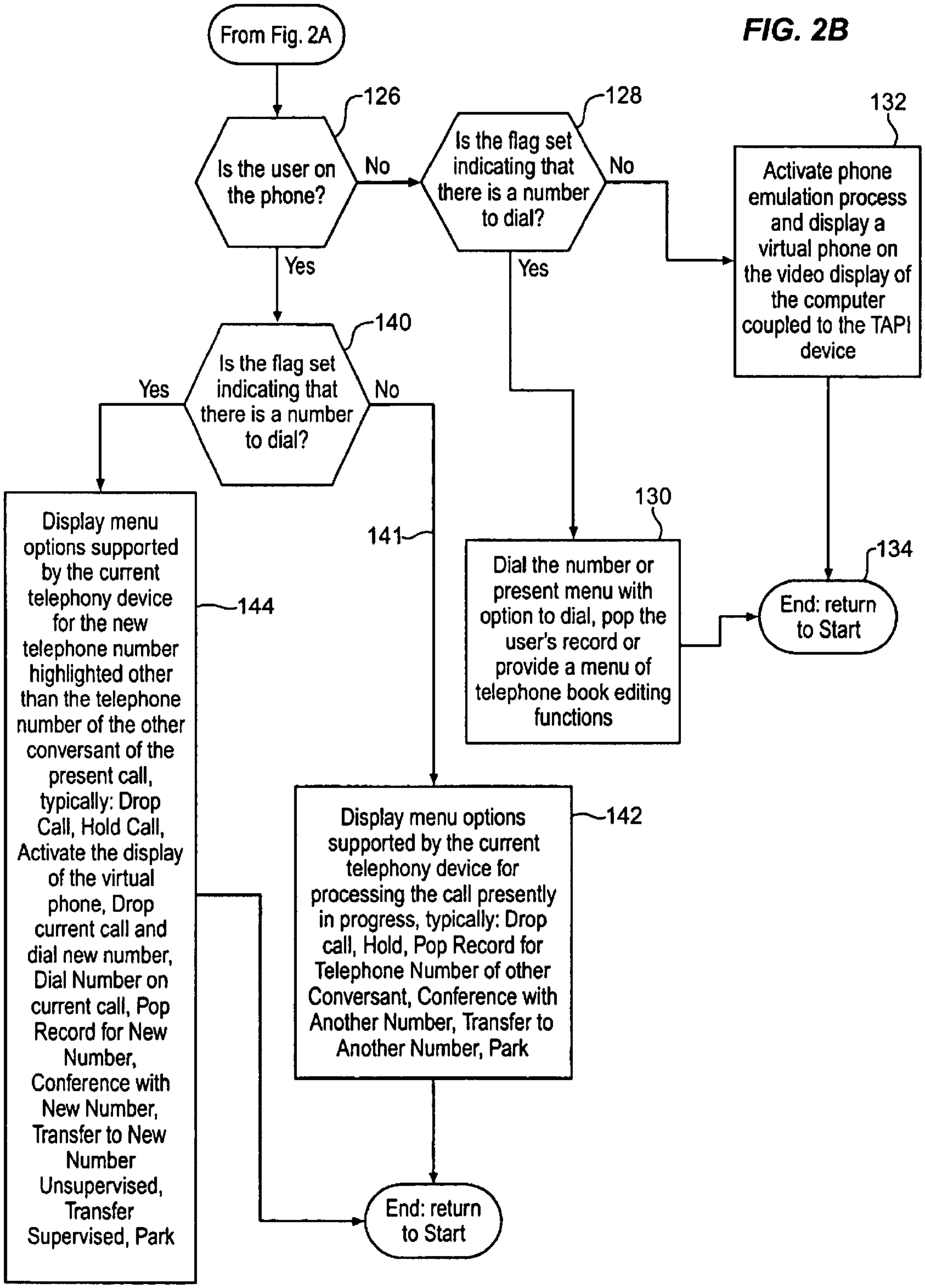

Block 59 represents a minidialer program that does processing symbolized by the flowcharts of FIGS. 2A and 2B to display context sensitive menus. In essence, the function of the minidialer program 59 is to add telephone dialing capabilities and a few other telephony functions such as conference, transfer, park etc. to whatever application program is currently controlling the computer. Although the minidialer program is shown as a separate application program in FIG. 1, it may be a part of the virtual telephone application process 50. In addition to the processing symbolized by FIGS. 2A and 2B, the preferred embodiment of the minidialer program also registers a minidialer icon with the operating system and cooperates with the operating system to cause the minidialer icon to be displayed in or near the title bar of the active window, and when another application program's window becomes the active window, for cooperating with the operating system to display the minidialer icon in or near the title bar of the new active window. In an alternative embodiment, the minidialer program cooperates with the operating system to display the minidialer icon in or near the system tray or at some other location on the desktop where it will always be visible. In some embodiments, the minidialer program 59 cooperates with the operating system to display the minidialer icon on the desktop or in the task bar or on or near the title bar of the overall display or under the apple menu as an option of a drop down menu or as an option of a drop down or pop up menu from a system icon anywhere on the desktop or in the title bar or system tray where the menu or information display indicates all the applications that are running in a multitasking environment whose windows can be made the active window by selecting the menu option.

The CPU 56 in FIG. 1 is usually a personal computer and has a video display 58, a keyboard 60, a mouse or trackpad or joystick or other pointing device 62 and a nonvolatile bulk storage such as hard disk 64. The operating system 54 communicates via various service provider interfaces 66 with a plurality of drivers for the various hardware devices such as the video display, keyboard etc. The drivers processes 68 communicate via signal paths 70 with other hardware interfaces 72 which function to communicate with the hardware devices such as display 58, keyboard 60, pointing device 62 and hard disk 64 with signals these devices understand.

The operating system 54 also communicates via a service provider interface 74 (hereafter service provider interfaces will be referred to as SPIs) with a TAPI device driver process 76 which is specifically designed to interface a TAPI telephony device 78 with the operating sytem 54 and the TAPI library programs therein. The TAPI telephony device 78 can be any of a number of devices compatible with the TAPI interface such as a modem, telephone, PBX etc. A TAPI telephony device is an apparatus which connects to a telephone system and controls some aspect of that telephone system, and is in turn controlled by a computer. The computer consists of any electronic apparatus which performs a programmed sequence of instructions. The program causes the computer to communicate with the TAPI telephony device 78 via a library of function calls to a library of computer programs each of which is capable of controlling the TAPI telephony device to implement a telephone function.

When a function call through the TAPI interface invokes a program in the TAPI library into execution, commands and/or data are sent via SPI 74 to the TAPI driver. The driver then converts those commands and/or data into commands and/or data which the specific telephony device 78 understands to carry out that particular function such as pick up the phone line and dial a specific number etc. Data and commands from the TAPI driver process 76 are sent via bus 80 to a hardware interface circuit 82 which converts them into signals on bus 84 which cause telephony device 78 to carry out the desired telephone function. The hardware interface circuit could be an expansion card circuit, a network interface, a serial port, a parallel port, an infrared link etc.—whatever the telephony device 78 requires.

When the CPU boots, dynamic linked libraries such as the TAPI library are loaded into system RAM not shown. Then when application processes such as process 50 are loaded, the OS looks for function calls to the TAPI interface in the program code of the application process and replaces it with the actual address in RAM where the program in the TAPI library that carries out that function begins. When the code of the application process is executing and the program counter reaches the position of that function call, control branches to the start of the program in the TAPI library that carries out that function.

As an example of how the various functional blocks cooperate to carry out a telephone function, suppose telephone device 78 is a telephone. An incoming call arrives on telephone line 84 coupled to the central office switch of the telephone service provider. The phone 78 generates a ringing status signal on bus 84 which is sensed by the hardware interface 82 by an interrupt or polling process. The hardware interface passes a message on bus 80 to TAPI driver process 76 which passes an interprocess message via SPI 74 to the OS 54. The OS passes an interprocess message to the application 50 via TAPI interface 52 informing application process 50 that the phone is ringing. The application process then passes a message back to OS 54 through the TAPI interface 52 or another API to cause the OS to paint a "Phone Ringing" message or dialog box on video display 58 via appropriate known processes. This message may include caller ID data passed up to application process 50 and queries whether the user wishes to answer the phone. If the user does wish to answer the phone, a keyboard or point and click command is issued via the pointing device to answer the phone. This message is passed up through hardware interface 72, driver 68, SPI 66 and OS 54 to application process 50. The application process then issues a command via a TAPI function call to invoke a program to control the telephony device 78 to go off-hook. This program runs and generate appropriate function calls via SPI 74 to the TAPI driver process which sends appropriate commands via bus 80 to the hardware interface 82. The hardware interface 82 generates appropriate signals on bus 84 to cause telephone device 78 to go off-hook to answer the phone. If the telephony device 78 is a speakerphone, the user then hears the caller's voice through the speakerphone. If the telephony device is only a modem, the incoming voice would be digitized in the modem 78 or hardware interface and the data routed up through the TAPI driver 76, OS 54, application 50 and back down through the OS and a driver 68 and hardware interface 72 for a set of speakers (not shown) connected to the computer 56 or internal thereto.

Referring to FIGS. 2A and 2B, there is shown a flowchart of processing by the context sensitive minidialer program to retrofit the active program with telephony functions and display context sensitive telephony menu options and perform certain processing in support of implementation of telephony functions. The process starts at block 97 and moves to block 99. Block 99 represents the process of retrofitting the active program with telephony functionality. This can be done by determining which program is controlling the computer to paint the active window and then using highlighted text or numbers or the lack thereof in the active window along with the on-hook or off-hook status of the telephony device to control subsequent processing and the content of context sensitive menus. In the preferred embodiment, the telephony functions are retrofitted to the active window by displaying a minidialer icon in or near the title bar of the active window. A mouse click on the icon brings a context sensitive drop down menu displaying the available telephony functions in the current state of affairs of on-hook/off-hook status and whether there is material selected in the active window. Other embodiments may put the minidialer icon in the system tray or under the Apple menu or in the title bar above the desktop or on the desktop itself. It really does not matter where the icon is displayed or whether an icon is used at all. For example, the telephony function menus may be displayed selectively only when a hot key combination is detected. Retrofitting with telephony functions is the genus and context sensitive displays of telephony functions which are available in a particular situation is a subgenus. Particular species within the genus include adding dial, conference, transfer and hold telephony functions to the active program and adding a pop function to the active program which can be invoked by a menu option from the minidialer menu. The pop function controls the computer to take a highlighted name or number in the active window and launch program and open a file that maintains records of people and/or orgainizations that includes their name and phone number and to use the name or number highlighted in the active window as a search key to find and display a record for the person or organization that has that name or phone number.

The process of block 100 is performed next. Block 100 symbolizing detection of an event indicating the user would like to see a display of the available minidialer telephony menu options for the particular context. This event could be a mouse click (or other pointing device click) on the minidialer icon (regardless of where it is displayed) or detection of a hot key combination defined as indicating a desire to launch the minidialer context sensitive menu display process or a right click on highlighted text in a Windows 98 active application window (or-any other operating system wherein context sensitive right click menus on highlighted text is provided). Next, in step 102, a determination is made whether any text or number in the active window is highlighted. The active window may be the window displayed by any application program that is currently controlling the computer and which can display text and numbers. If no text or numbers are highlighted, test 102 vectors processing to block 104 where a flag is set indicating that there is no telephone number to dial. This flag is set whenever the user has highlighted a valid telephone number or has highlighted text which matches a name in the phone book maintained either by the minidialer program 59 or the virtual telephone application process or a name in a file pointed to by a pointer in configuration data established by the user. From block 104, processing flows to FIG. 2B which will be explained further below.

If test 102 determines that text or numbers in the active window are highlighted, processing flows to test 106. There, the minidialer program examines the characters which are highlighted in the active window to determine if they contain a phone number. If they appear to contain a phone number, processing flows to test 108 to determine if the phone number is already stored in the phone book or a file pointed to by configuration data. If it is, processing flows to block 110 to set the flag indicating that a phone number to dial is available. If the phone number which the user highlighted is not in the phone book or the file pointed to by the configuration data, test 108 vectors processing to block 112 where the phone number is added to the phone book or file pointed to by the configuration data.

In the preferred embodiment, the virtual phone application 50 in FIG. 1 maintains a phone/address book with names and phone numbers of persons and organizations. In some embodiments, a dialog box pops up to prompt the user for a name to be associated with the phone number. In the preferred embodiment, if the user highlights a piece of text that appears to contain a name followed by a phone number, the mini dialer adds both the name and number to its internal database and dials the number as though the user had only highlighted the number. But it does not request a name to associate with the number, since it assumes it already has one.

Returning to the consideration of test 106, if the characters highlighted in the active window are not a phone number, processing flows to test 114. Test 114 assumes that any text highlighted is a name and determines if the highlighted characters match any known name in the phone/address book or the file pointed to by the configuration data. Test 114, also represents an alternative species wherein an interrupt is generated and the highlighted text is passed to an interrupt service routine which uses the highlighted text to search a database or file for a name match, and if a match is found returning at least the phone number corresponding to the name. If there is a match, processing flows to block 116 to look up the phone number corresponding to the name in the phone book or file pointed to by the configuration data. After the processing of either block 112 or block 116, a phone number to dial is available, so processing flows to block 110 to set the flag indicating that a phone number to dial is available. Processing then flows to step 126 in FIG. 2B.

Returning to the consideration of test 114, if it is determined that the highlighted text is not a name, processing flows to test 120. The purpose of test 120 is to determine if the highlighted text is a uniform resource locator (hereafter URL) address for a web page on the world wide web. If it is a URL, processing flows to block 122 to launch a web browser and open the web page at the URL corresponding to the highlighted text. In some embodiments, test 120 and step 122 are not present. After step 122, processing returns to start block 99, and symbolized by block 123.

If test 120 determines that the highlighted text is not a URL, processing flows to block 124 where the highlighted text is assumed to be a new name and is added to the phone/address book or the file pointed to by the configuration data. Then step 104 is performed to set the flag indicating a phone number is available to dial, and processing flows to step 126 on FIG. 2B.

Test 126 is a determination as to whether the user is on the phone. At this point, there either will or there will not be a phone number to dial and the content of further processing depends upon whether there is or is not a phone number to dial. If the user is not on the phone, test 128 is performed to determine if the flag is set indicating there is a number to dial. If there is a number to dial, step 130 is performed to dial the number. In an alternative embodiment, when the user is not on the phone but a number is highlighted, the minidialer responds to a mouse click on the dialer icon or a hot key event by present a menu with an option to dial the number or pop the user's record from a program like a contact manager application or provide a menu of telephone book editing functions such as an option to add the number or look up the name etc. In another alternative embodiment, configuration data can be set by the user to default to either dial the number, or pop the record or present the user with a menu of phone book editing functions.

The pop function is well known and has been in public use in the assignees software applications such as PhoneKits and CT Pro for several years, but its addition to the minidialer application is new. Basically, the pop function launches the contact manager database application, and launches a macro to use the highlighted number to look up the record for the person having that number including name, address past buying history, special needs etc. and displaying that record for the user on the computer display. If the dial menu option is selected, the appropriate function call is made through the TAPI or other interface to the telephony function programs to invoke a computer program which controls the computer to send appropriate commands through the TAPI or other telephony device driver to the telephony device to dial the highlighted number.

If test 128 determines that the phone number flag is not set, step 132 is performed to activate the virtual telephone emulation application process 50 in FIG. 1. Process 50 then launches and displays a virtual telephone on the video display of the computer so that the user can physically dial a phone number or type in a few letters of the name the user wants to call and have the virtual phone process automatically look up the correct name and phone number which matches the letters typed in. The user can then click on the dial virtual button and the computer will be controlled to dial the number through the TAPI device. Processing then returns to start block 99 as symbolized by block 134.

Returning to the consideration of test 126, if it is determined that the user is on the phone, processing is vectored to test 140. There it is determined if the flag is set indicating that there is a phone number to dial. If the user is on the phone but there is no number to dial, then processing is vectored along path 141 to block 142. This path 141 is also taken if the phone number highlighted is the same number originally called to establish the current conversation or is the number of the person who called the user of the computer. Block 142 represents the process of displaying a first set of available telephony options appropriate to this particular state of affairs and which are supported by the current telephony device and the telephony library based upon an assumed intent of the user given the current situation. If the user is on the phone and there is a phone number to dial which is different than the current number engaged in the ongoing conversation, then the program assumes a different intent by the user and test 140 vectors processing to block 144 to display a different set of menu options appropriate to the current state of affairs and the assumed intent of the user. Block 142 displays menu options supported by the current telephony device for processing the call currently in progress given the fact that there is no new number highlighted to dial. In this circumstance, the displayed menu options are, typically: Drop call, Hold, Pop Record for Telephone Number of other Conversant, Conference With Another Number, Transfer to Another Number, Park.

If the user selects Conference or either version of Transfer with no number highlighted or previously looked up based upon a search based upon the highlighted name, a dialog box is popped open on the display. This dialog box prompts the user for a telephone number or name or both of the person to dial in for the conference (if only the name is given, the number will be automatically looked up in the phone book in the preferred embodiment but it will not be in other embodiments) or to whom the call is to be transferred. This dialog box also gives the user an option to browse the phone book maintained on the computer, and, in the preferred embodiment, this dialog box also shows a history list comprised of the names and numbers of the last few people previously called any of which may be selected for the conference or transfer.

If processing is vectored to block 144, the options supported by the current telephony device which are displayed are ones which are appropriate to the assumed intent of a user who is on a call but who has highlighted another telephone number or another name of a person stored in the phonebook or file pointed to by the configuration data. Those options are, typically: Drop Call, Hold Call, Activate the display of the virtual phone, Drop current call and dial new number, Dial Number on current call, Pop Record for New Number, Conference with New Number, Transfer to New Number Unsupervised, Transfer Supervised, Park.

When any of these options is selected, the minidialer program makes the appropriate function call to the telephony function library to invoke the program to control the computer to carry out the selected telephony function. In the case of the pop function, the minidialer program controls the computer to launch whatever contacts manager program designated by a user and open whatever file is designated by a user in configuration data. The contacts manager program maintains records of persons and organizations which include the phone number and name of each entity. The minidialer then uses the highlighted name or number as a search key to search the records of the file using a prewritten macro of commands native to the launched contacts manager program. Any record with a hit is then displayed to the user.

After either block 144 or block 142 is performed, processing returns to start block 99.

Figure 3:
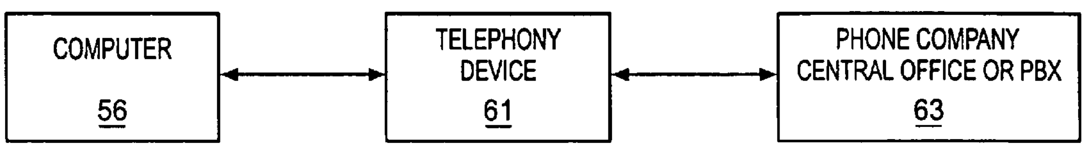
FIG. 3 is a block diagram representing the genus of hardware systems in which the processes of the invention can be practiced.

Referring to FIG. 3, there is shown a block diagram of a physical system which describes the genus of possible systems that could be used to implement the the invention. Any type of computer 56 is coupled by a serial LAN, serial port, modem port, parallel bus, SCSI bus or PCI or other system bus of computer 56 to any type of telephony device 61. The telephony device can be a modem, a telephone or any other type of telephony device capable of cooperating with a program in a library of telephony functions so as to carry out the telephony options on the minidialer menu. The telephony device is coupled to a telephone system 63 such as the central switching office of a telephone service provider or a PBX. This connection can be via a telephone line or via a compucall interface if the telephone system 63 is a PBX.

The computer 56 does not have to be a Windows OS computer, and the telephony device does not have to be a TAPI compliant device so long as it is compatible with the library of telephony function programs in computer 56. The telephony device may be part of computer 56, an expansion card for computer 56, part of the telephone system 63 or a stand alone device.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. An apparatus, comprising:

a computer controlled by an operating system program and having a telephone function library of programs that control the computer to implement conventional telephone functions, said operating system controlling said computer to implement a telephony application programmatic interface (TAPI), comprising a plurality of function calls that are invoked to implement various telephone functions, said operating system being configured to run a dialer program and at least one application program that differs from the dialer program, wherein the at least one application program does not comprise a telephone application program or an operating system navigation utility, wherein the dialer program has an associated phone book file, the phone book file not being associated with the at least one application program, and wherein the dialer program determines activity status of the at least one application program;

a TAPI compliant telephony device (TAPI device) coupled to said computer by a data path and structured for connection to a telephone line from a telephone service provider, said TAPI device being interfaced with a TAPI compliant driver program, said driver program being capable of receiving telephone function commands from said programs in said telephone function library and converting the telephone function commands to commands and/or signals specific to said TAPI device and for sending said commands and/or signals to said TAPI device to cause the TAPI device to carry out telephone functions;

a keyboard coupled to said computer for providing user inputs;

a pointing device coupled to said computer for providing user inputs; and a video display coupled to said computer, wherein the dialer program is configured to retrofit a dialer representation on a title bar of a window of the at least one application program lacking telephony capabilities only when the at least one application program is active to provide the telephony capabilities to the at least one application program, wherein, when a user selects, via the keyboard or the pointing device, the retrofitted dialer representation, the dialer program accesses the phone book file to search for a phone number to be dialed by the dialer program, and wherein the searching of the phone book file is based on a search key, the search key comprising text that is displayed in a window of the at least one application program and highlighted by the user via the keyboard or the pointing device before the user selects the retrofitted dialer representation.

2. The apparatus of claim 1 wherein said dialer program retrofits the dialer representation so as to always be visible on a title bar of a window of an active application program.

3. The apparatus of claim 2 wherein said dialer program retrofits the dialer representation near the title bar of a currently active window of a currently active application program.

4. The apparatus of claim 2 wherein said dialer program also displays a dialer icon in or near the system tray of a Windows 95 operating system driven desktop video display.

5. The apparatus of claim 1 wherein said dialer program displays one or more drop down menus when a pointing device click on said dialer representation is detected, the menu options displayed on said drop down menus being dependent upon whether the user is or is not currently engaged in a telephone conversation via said TAPI device.

6. The apparatus of claim 1 wherein said dialer program displays one or more drop down menus when a hot key combination event is detected comprising pressing a predetermined combination of several keys on said keyboard simultaneously, the menu options displayed on said drop down menus being dependent upon whether the user is or is not currently engaged in a telephone conversation via said TAPI device.

7. The apparatus of claim 1 wherein said dialer program stores names and telephone numbers in the phone book file stored in memory or on a hard disk of said computer and displays menu options which depend upon one or more of the following factors:

whether the user has any text or numbers selected in a window of the current application program;

whether the selected text or numbers appear to contain a phone number or not;

if not a phone number, whether the selected text matches any stored name in the phone book file;

whether or not the user is or is not currently using said TAPI device in an ongoing telephone conversation; and regardless of whether the user is or is not currently engaged in a telephone conversation, whether or not a telephone number has been highlighted in a window of the current application program.

8. The apparatus of claim 7 wherein said dialer program further displays menu options which depend upon one or more of the following factors:

if the selected text does not contain a phone number and does not match a name in said phone book file, whether the selected text appears to be a URL.

9. The apparatus of claim 8 wherein an application program controlling said computer is a web browser program and wherein said dialer program controls said computer to launch said web browser if the user has selected text in the active window of the active application program which is a URL and to cause said web browser to open the web page located on the world wide web at the URL which is highlighted.

10. The apparatus of claim 1 wherein said dialer program displays all available telephony function options in a menu when a hot key combination is pressed with the available options for the particular context displayed in contrasting color to options which are not available.

11. The apparatus of claim 1 wherein said dialer program displays all available telephony function options in a menu when a pointing device click on a dialer icon is detected with the available options for the particular context displayed in contrasting color to options which are not available.

12. The apparatus of claim 1 wherein said dialer program displays all available telephony function options in a menu when a hot key combination is pressed or a pointing device click on a dialer icon is detected with the available options for the particular context signalled to the user.

13. A method for a computer coupled to a telephony device to implement telephony functions, comprising:

executing, on an operating system platform, a dialer program and at least one application program that differs from the dialer program, wherein the at least one application program does not comprise a telephone application program or an operating system navigation utility, and wherein the dialer program has an associated phone book file, the phone book file not being associated with the at least one application program;

by the dialer program, determining activity status of the at least one application program;

by the dialer program, retrofitting a dialer representation on a title bar of a window of the at least one application program lacking telephony capabilities only when the at least one application program is active to provide the telephony capabilities to the at least one application program;

by the dialer program, accessing the phone book file to search for a phone number to be dialed by the dialer program, the accessing being triggered when a user selects, via an input device, the retrofitted dialer representation; and by the dialer program, searching the phone book file for the phone number based on a search key, the search key comprising text that is displayed in a window of the at least one application program and highlighted by the user via the input device before the user selects the retrofitted dialer representation.

14. The method of claim 13, further comprising determining an active program which is currently controlling the computer and adding dial, conference, transfer and hold telephony functions to said active program and wherein said dial, conference, transfer and hold telephony functions can be carried out by a user by invoking selections from a telephony menu.

15. The method of claim 13, further comprising adding one or more telephony functions to an active application program including the ability to determine if a highlighted section of text in the active window painted by said active program is a phone number or a name and if the highlighted text is a name, looking up the phone number for the name in the phone book file and displaying menu options for dial and pop which the user can select, and, if the dial option is selected, controlling said TAPI device to dial the number, and if the pop option is selected, controlling said computer to launch an application process which stores records of people or organizations which can be searched by name or telephone number and searching a file of people or organizations maintained on said computer using the highlighted name or phone number and displaying any record which matches the name or number.

16. An article, comprising:

a storage medium having stored thereon instructions that when executed by a machine result in the following:

executing, on an operating system platform, a dialer program and at least one application program that differs from the dialer program, wherein the at least one application program does not comprise a telephone application program or an operating system navigation utility, and wherein the dialer program has an associated phone book file, the phone book file not being associated with the at least one application program;

by the dialer program, determining activity status of the at least one application program;

by the dialer program, retrofitting a dialer representation on a title bar of a window of the at least one application program lacking telephony capabilities only when the at least one application program is active to provide the telephony capabilities to the at least one application program;

by the dialer program, accessing the phone book file to search for a phone number to be dialed by the dialer program, the accessing being triggered when a user selects, via an input device, the retrofitted dialer representation; and by the dialer program, searching the phone book file for the phone number based on a search key, the search key comprising text that is displayed in a window of the at least one application program and highlighted by the user via the input device before the user selects the retrofitted dialer representation.

* * * * *